United States Patent
Hanano et al.

(10) Patent No.: US 9,527,470 B2
(45) Date of Patent: Dec. 27, 2016

(54) GAS GENERATOR

(71) Applicant: DAICEL CORPORATION, Osaka-shi, Osaka (JP)

(72) Inventors: Teppei Hanano, Tatsuno (JP); Masayuki Yamazaki, Tatsuno (JP); Naoki Matsuda, Tatsuno (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 14/913,197

(22) PCT Filed: Jul. 16, 2014

(86) PCT No.: PCT/JP2014/068856
§ 371 (c)(1),
(2) Date: Feb. 19, 2016

(87) PCT Pub. No.: WO2015/025643
PCT Pub. Date: Feb. 26, 2015

(65) Prior Publication Data
US 2016/0200283 A1    Jul. 14, 2016

(30) Foreign Application Priority Data

Aug. 20, 2013 (JP) ................................ 2013-170100

(51) Int. Cl.
*C06D 5/00* (2006.01)
*B60R 21/26* (2011.01)
(Continued)

(52) U.S. Cl.
CPC ......... *B60R 21/264* (2013.01); *B60R 21/2644* (2013.01); *F42B 3/04* (2013.01); *B60R 2021/26011* (2013.01)

(58) Field of Classification Search
USPC ........ 102/530, 531, 334; 280/736, 741, 740, 280/728.1
See application file for complete search history.

(56) References Cited

U.S. PATENT DOCUMENTS

| 4,561,675 A | 12/1985 | Adams et al. |
| 6,068,290 A | 5/2000 | Sheng |

(Continued)

FOREIGN PATENT DOCUMENTS

| JP | 50-75995 A | 6/1975 |
| JP | 51-83331 A | 7/1976 |

(Continued)

OTHER PUBLICATIONS

International Search Report, issued in PCT/JP2014/068856; dated Oct. 28, 2014.

(Continued)

*Primary Examiner* — J. Woodrow Eldred
(74) *Attorney, Agent, or Firm* — Birch, Stewart, Kolasch & Birch, LLP

(57) ABSTRACT

The present invention provides a gas generator including
an ignition device provided at one end of a cylindrical housing and a diffuser portion having a gas discharge port and provided at the other end of the housing,
molded articles of a gas generating agent and a molded article of a pressure increasing agent charged into a combustion chamber inside the cylindrical housing,
the molded articles of a gas generating agent charged into a charging space remained except for a charging portion for the molded article of a pressure increasing agent inside the combustion chamber such that the molded articles of a gas generating agent are in contact with the ignition device and a total volume of the molded articles of a gas generating agent is less than a volume of the charging space,
the molded article of a pressure increasing agent charged in contact with the molded articles of a gas generating agent at a position axially distant from the ignition device, (Continued)

a combustion temperature of the molded articles of a gas generating agent being 1000° C. to 1700° C., and a combustion temperature of the molded article of a pressure increasing agent being higher than that of the molded articles of a gas generating agent, a charged mass of the molded articles of a gas generating agent being larger than a charged mass of the molded article of a pressure increasing agent, and the molded article of a pressure increasing agent being to burn out before burnout of the molded articles of a gas generating agent at the time of actuation.

11 Claims, 1 Drawing Sheet

(51) Int. Cl.
    *B60R 21/264*     (2006.01)
    *F42B 3/04*     (2006.01)

(56) References Cited

U.S. PATENT DOCUMENTS

| | | | |
|---|---|---|---|
| 6,851,373 B2 | 2/2005 | Quioc | |
| 7,784,829 B2* | 8/2010 | Hirooka | B60R 21/2644 280/736 |
| 8,469,398 B2* | 6/2013 | Numoto | B60R 21/263 102/530 |
| 2005/0200107 A1 | 9/2005 | Matsuda et al. | |
| 2006/0005734 A1* | 1/2006 | McCormick | B60R 21/2644 102/530 |
| 2009/0121464 A1* | 5/2009 | Numoto | B60R 21/2644 280/741 |
| 2010/0253053 A1* | 10/2010 | Hayakawa | B60R 21/2646 280/736 |
| 2011/0187088 A1 | 8/2011 | Hanano et al. | |
| 2013/0319586 A1 | 12/2013 | Kobayashi | |
| 2016/0214564 A1* | 7/2016 | Imoto | B60R 21/2644 |

FOREIGN PATENT DOCUMENTS

| | | |
|---|---|---|
| JP | 11-245760 A | 9/1999 |
| JP | 2005-199867 A | 7/2005 |
| JP | 2005-313812 A | 11/2005 |
| JP | 2011-157025 A | 8/2011 |
| JP | 2012-211064 A | 11/2012 |
| WO | WO 2008/108745 A2 | 9/2008 |

OTHER PUBLICATIONS

Written Opinion of the International Searching Authority, issued in PCT/JP2014/068856 (PCT/ISA/237), dated Oct. 28, 2014.

International Preliminary Report on Patentability and English translation of the Written Opinion of the International Searching Authority (Forms PCT/IB/373 and PCT/ISA/237), dated Feb. 23, 2016, for International Application No. PCT/JP2014/068856.

JP-50-75995-A, published Jun. 21, 1975, together with an English translation thereof.

JP-51-83331-B2, published Jul. 21, 1976, together with an English translation thereof.

\* cited by examiner

GAS GENERATOR

TECHNICAL FIELD

The present invention relates to a gas generator used in an airbag apparatus, or the like.

DESCRIPTION OF RELATED ART

A gas generator is known in which an igniter is disposed at one end inside an elongated housing, a gas discharge port is formed at the opposite side, and a solid gas generating agent is charged into the housing. With such a gas generator, the combustion of the gas generating agent is started by the ignition initiated by the igniter, and the combustion of the unburned gas generating agent advances to the opposite side.

In a gas generator disclosed in JP-A No. 2011-157025, a cylindrical member 30 having a communication hole 37 is disposed inside an elongated cylindrical housing 10, and a second gas generating agent 50 is charged inside the cylindrical member 30. A gap is present between the cylindrical housing 10 and the cylindrical member 30. Therefore, the combustion gas moves through the gap and goes in and out from the communication hole 37. As a result, the second gas generating agent 50 charged at a position set apart from the igniter also burns easily.

U.S. Pat. No. 6,851,373 discloses a gas generator 10 in which an initiator assembly 18 is attached to one end of a housing 12, and a nozzle adaptor 50 is formed at the opposite end.

In such a gas generator, an igniter 22 is disposed at one side in a portion where a plurality of tablet-shaped gas generating agents 32 is arranged inside the housing 12, and an auto-ignition material 46 is disposed at the opposite side. Further, a filter 48 is disposed between the auto-ignition material 46 and the nozzle adapter 50.

The auto-ignition material 46 is usually ignited and causes the gas generating agent 32 to burn out before the strength of the housing 12 is degraded by heat when the temperature outside the housing is raised by flame, or the like, such a configuration being similar to that of the auto ignition device depicted in FIG. 2 of U.S. Pat. No. 4,561,675.

Therefore, the auto-ignition material 46 is set to be rapidly burned out as a result of being disposed close to the igniter 22, so that no effect is provided on the gas generation state when the gas generator is normally actuated.

SUMMARY OF INVENTION

The present invention provides a gas generator including
an ignition device provided at one end of a cylindrical housing and a diffuser portion having a gas discharge port and provided at the other end of the housing, molded articles of a gas generating agent and a molded article of a pressure increasing agent charged into a combustion chamber inside the cylindrical housing, the combustion chamber being a space inside the cylindrical housing excluding the ignition device and the diffuser portion, the molded articles of a gas generating agent being charged, in a charging space remained except for a charging portion for the molded article of a pressure increasing agent inside the combustion chamber such that the molded articles of a gas generating agent are in contact with the ignition device and a total volume of the molded articles of a gas generating agent is less than a volume of the charging space, the molded article of a pressure increasing agent being charged in contact with the molded articles of a gas generating agent at a position axially distant from the ignition device in the combustion chamber, a combustion temperature of the molded articles of a gas generating agent being 1000° C. to 1700° C., and a combustion temperature of the molded article of a pressure increasing agent being higher than that of the molded articles of a gas generating agent, the molded articles of a gas generating agent and the molded article of a pressure increasing agent being different from each other in at least one of shape, size, composition and composition ratio, a charged mass of the molded articles of a gas generating agent being larger than a charged mass of the molded article of a pressure increasing agent, and the molded article of a pressure increasing agent being to burn out before burnout of the molded articles of a gas generating agent at the time of actuation.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
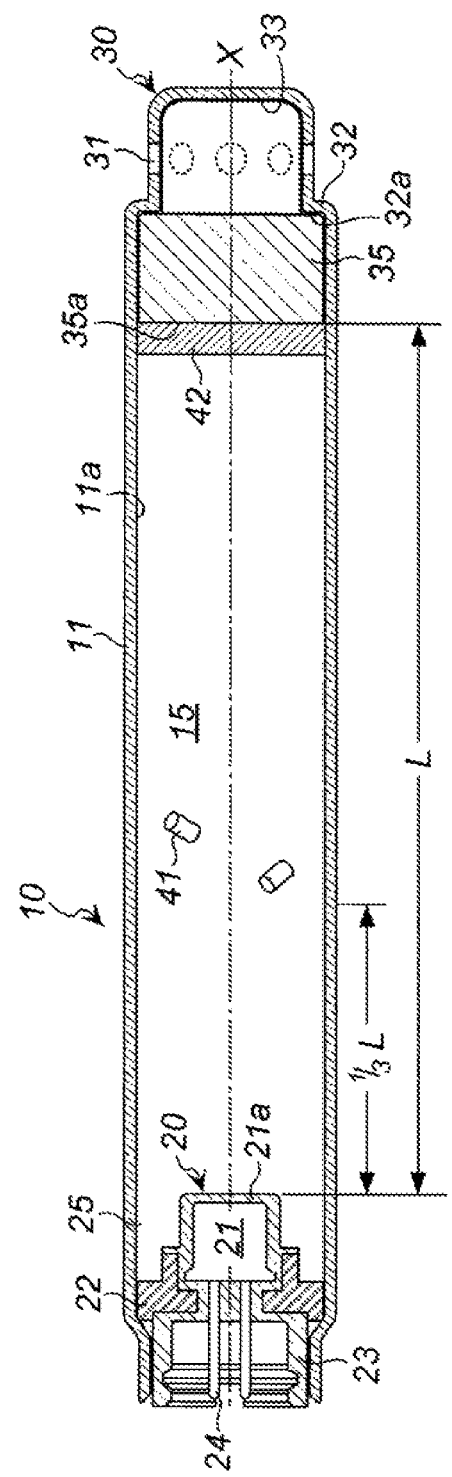
FIG. 1 shows a cross-sectional view in the axial direction of a gas generator including an embodiment of the present invention.

The present invention provides a gas generator that ensures rapid ignition and combustion of the gas generating agent inside a combustion chamber even when the gas generator uses a housing of an elongated shape.

In the gas generator in accordance with the present invention, the molded articles of a gas generating agent and the molded article of a pressure increasing agent are charged into the combustion chamber.

The molded articles of a gas generating agent are the same as are used in the conventional gas generators and generates a high-temperature gas when ignited and burned by a combustion product (a flame, a high-temperature gas, or the like) generated on actuation of the ignition device.

The molded article of a pressure increasing agent generates a high-temperature gas by combustion and acts to raise the pressure in the combustion chamber by the high-temperature gas and enhances the combustion of the molded articles of a gas generating agent.

The molded articles of a gas generating agent are charged in contact with the ignition device in the charging space inside the combustion chamber, and the total volume of the molded articles of a gas generating agent is less than the volume of the charging space.

The molded articles of a gas generating agent are charged to have a small gap therebetween and not to be in intimate contact with each other. In other words, a plurality of molded articles of a pellet or granular shape are randomly arranged inside the combustion chamber, and the molded articles of a gas generating agent are not charged to be in a densely packed state. Therefore, inside the combustion chamber, gaps are present between the adjacent molded articles of a gas generating agent from the end of the combustion chamber at the ignition device side to the other end at the side of the molded article of a pressure increasing agent.

For this reason, the combustion product generated on actuation of the ignition device easily moves in the axial direction through those gaps, and the combustion gas generated by combustion of the molded articles of a gas generating agent also easily moves in the axial direction. As a result, the molded article of a pressure increasing agent charged at a position that is not in contact with the ignition device also burns easily.

The molded articles of a gas generating agent can be molded to a columnar, rectangular cylinder, or disk-like shape. A mixture of the molded articles of a gas generating agent which differ in shape or dimensions can be also charged. A hollow, a recess, or a through hole may be also formed in each molded article of a gas generating agent.

The molded article of a pressure increasing agent is positioned apart from the ignition device in the axial direction inside the combustion chamber.

Further, the molded article of a pressure increasing agent is disposed, in the combustion chamber, in contact with the molded articles of a gas generating agent, and the combustion product from the ignition device and the combustion gas generated from the gas generating agent in the vicinity of the ignition device pass through the gaps between the molded articles of a gas generating agent and ignite the molded article of a pressure increasing agent. Therefore, the pressure in the entire combustion chamber easily rises. Thus, in order to facilitate the flow of the combustion product and the combustion gas toward the molded article of a pressure increasing agent, such an arrangement can be made in the cylindrical housing as in the following order: the ignition device, the molded articles of a gas generating agent, and the molded article of a pressure increasing agent, from one end to the other end where the diffuser portion is present, of the cylindrical housing.

Further, the unburned molded articles of a gas generating agent at a distance from the ignition device are also easily ignited. Thus, even with the combustion chamber of an elongated shape, the charged molded articles of a gas generating agent burn out over a short period of time. Therefore, it is not necessary to form a gap between the cylindrical housing and cylindrical member as in JP-A No. 2011-157025, and the gas generator can be downsized.

Further, the molded article of a pressure increasing agent is arranged such as to occupy the entire cross section of the combustion chamber in the direction perpendicular to the longitudinal axis of the housing, in order that the molded article of a pressure increasing agent contacts easily with the combustion product and the combustion gas.

The combustion temperature of the molded articles of a gas generating agent is 1000° C. to 1700° C., and the combustion temperature of the molded article of a pressure increasing agent is higher than that of the molded articles of a gas generating agent. The combustion temperature is calculated by the NEWPEP program disclosed in WO2008/108745 A2.

As the molded articles of a gas generating agent, the one including guanidine nitrate and basic copper nitrate disclosed in JP-A No. 2005-199867, or the one including a fuel component including melamine cyanurate, an oxidizing agent component including basic metal nitrate and a basic metal carbonate, disclosed in JP-A No. 2012-211064 can be used.

The molded articles of a gas generating agent of such compositions have a low combustion temperature and do not ignite easily, but they are preferred from the standpoint of gas components during combustion and the generated residues. An additive may be added or other compounds may be used, provided that the aforementioned advantages are maintained.

As the molded article of a pressure increasing agent, a gas generating agent including nitroguanidine and strontium nitrate disclosed in JP-A No. 2005-199867 can be used. Likewise, other components may be used, provided that the combustion temperature is higher than that of the molded articles of a gas generating agent. At least one of a shape, a dimension, a composition, and a composition ratio of the molded article of a pressure increasing agent is made different from that of the molded article of a gas generating agent, such that the molded article of a pressure increasing agent burns out earlier than the molded articles of a gas generating agent. A time required to burn out the molded articles can be theoretically determined based on the shortest combustion length (web) and a burning rate with respect to each individual molded article.

More specifically, the burning rate is measured by using a sample for measuring the burning rate, called a strand molded article. With this method, a mixture including the components of the molded articles of a gas generating agent or the molded article of a pressure increasing agent is molded into a columnar strand molded article (having an outer diameter of about 10 mm, a length of about 12.7 mm) by applying a force up to a deformability (compressibility) limit, the molded article is thoroughly dried, a nichrome wire is attached to one end surface to enable the propagation of combustion from the one end surface to the opposite end surface, an epoxy resin adhesive is coated on the opposite end surface and the circumferential surface, and in this state, the nichrome wire is electrified, the strand molded article is ignited and burned in a sealed cylinder which has been purged with nitrogen and pressurized to 7 MPa, and the burning rate is determined. The capacity of the sealed cylinder is selected so as to detect pressure change during combustion of the strand molded article inside the cylinder. As for the burning rate, the length of the strand molded article before the combustion is divided by the time elapsed from the start of pressure increase inside the sealed cylinder till the arrival at a peak pressure, and a value thus obtained is defined as the burning rate.

The shortest combustion length is the shortest combustion distance for burning out one molded article of a gas generating agent or one molded article of a pressure increasing agent. The shortest combustion length is determined by actual measurements.

In the gas generator in accordance with the present invention, the molded articles of a gas generating agent at a position in contact with the ignition device are ignited and burned by the combustion product generated from the ignition device due to the actuation.

Part of the combustion product flows in the axial direction (toward the diffuser portion) through the gaps between the molded articles of a gas generating agent, reaches the molded article of a pressure increasing agent, and causes ignition and combustion thereof, which results in gas generation.

Since the increase in pressure inside the combustion chamber is thus accelerated by the combustion gas generated from the molded article of a pressure increasing agent, the combustion of the unburned molded articles of a gas generating agent is also accelerated.

At the initial stage of actuation, since an amount of gas generated from the molded articles of a gas generating agent is less than an amount of gas discharged from the gas discharge port, the increase in pressure inside the combustion chamber is suppressed, but because the molded article of a pressure increasing agent is used as described hereinabove, the pressure inside the combustion chamber at the initial stage of actuation is maintained.

The molded article of a pressure increasing agent can be charged to two or more separate locations in the longitudinal axis direction, provided that abovementioned action is demonstrated.

The ignition device may be a known electric igniter, or a combination of an electric igniter with a known transfer charge or gas generating agent.

A device for controlling the discharging direction of the combustion product generated by the ignition device can be also attached.

For example, when the ignition device includes an electric igniter, the diffusion of combustion product in the radial direction is prevented by arranging a cylindrical guide such as to cover, from the outside, an ignition portion storing an ignition agent. In addition, the distal end of the guide can be reduced in diameter to form a jet flow of the combustion product.

In order to ensure that the combustion product generated from the ignition device reaches, ignites and burns the molded article of a pressure increasing agent which is located apart from the ignition device, it is preferred that the combustion product includes thermal particles (molten metal or metal oxide). Therefore, when the ignition device includes an electric igniter, boron potassium nitrate which generates thermal particles on combustion can be additionally used as the ignition agent, or a mixture of titanium hydride and potassium perchlorate can be used as the ignition agent of the ignition device.

It is also possible to dispose a metal foil between the ignition device and the molded article of a pressure increasing agent and bring small pieces of the burned metal foil as thermal particles into contact with the molded article of a pressure increasing agent.

Preferably, the present invention provides the gas generator, wherein
the total volume (V1) of the molded articles of a gas generating agent and the volume (V2) of the charging space of the molded articles of a gas generating agent satisfy the relationship V1/V2=0.50 to 0.90 when the molded articles of a gas generating agent do not have a through hole.

Where V1/V2 is adjusted to a range of 0.50 to 0.90, gaps are maintained between the molded articles of a gas generating agent, the combustion product generated by the actuation of the ignition device easily reaches the molded article of a pressure increasing agent, and the molded articles of a gas generating agent are prevented from colliding with each other and pulverizing due to the presence of too many gaps.

When the molded articles of a gas generating agent are used which have a through hole, the through hole functions as a propagation path for the combustion product. In this case, where the volume of the through holes is subtracted from V1 and added to V2, a smaller numerical value range is obtained for V1/V2.

Where the molded articles of a gas generating agent are used that have a recess (a depression), the depression does not function as a propagation path for the combustion product. Therefore, the V1/V2 ratio has the same numerical range as when the through hole is not present.

Preferably, the present invention provides the gas generator, wherein
the molded article of a pressure increasing agent is charged between a position at a distance of 1/3L from the ignition device and the diffuser portion, where L stands for the length of the combustion chamber.

The molded article of a pressure increasing agent functions, by their combustion, to increase the pressure inside the combustion chamber and enhance the ignition and combustion of the molded articles of a gas generating agent.

The demonstration of the abovementioned function is facilitated by adjusting the charging location of the molded article of a pressure increasing agent as described hereinabove.

Preferably, the present invention provides the gas generator, wherein,
inside the combustion chamber,
the molded article of a pressure increasing agent is charged such as to form a disk abutting against the inner circumferential surface of the cylindrical housing, and
the molded articles of a gas generating agent are charged into one or two remaining columnar spaces.

When the molded article of a pressure increasing agent is disposed at one end (on the diffuser portion side) of the combustion chamber, the molded articles of a gas generating agent are charged into a columnar space from the ignition device to the molded article of a pressure increasing agent.

When the molded article of a pressure increasing agent is disposed at a location between the ignition device and the diffuser portion, the molded articles of a gas generating agent are charged into two columnar spaces positioned at two sides of the molded article of a pressure increasing agent in the axial direction.

Since the molded article of a pressure increasing agent and the molded articles of a gas generating agent are charged and arranged in the above-described manner inside the cylindrical housing (inside the combustion chamber), the cross-sectional areas of the molded article of a pressure increasing agent and the molded articles of a gas generating agent in the direction (the radial direction) perpendicular to the axial direction are the same.

Thereby, when the combustion product generated from the ignition device moves toward the diffuser portion, the collision thereof with the molded article of a pressure increasing agent is necessarily facilitated.

For example, a pressure increasing agent which is less in size than the gas generating agent may be accommodated in a thin container and disposed inside the combustion chamber.

Preferably, the present invention provides the gas generator, wherein
a filter is disposed between the combustion chamber and the diffusion portion.

The filter is the same one as that is used in gas generators provided with a known gas generating agent.

Preferably, the present invention provides the gas generator, wherein
the molded article of a pressure increasing agent is charged to the end portion of the combustion chamber opposite the ignition device, and the molded article of a pressure increasing agent and the molded articles of a gas generating agent are separated by a partition wall, and
the partition wall is selected from a partition wall formed of a metal that is melted and deformed by heat at the time of actuation, a partition wall that is burned by heat at the time of actuation, a partition wall that is not melted or deformed by heat at the time of actuation but has ports.

The partition wall serves to prevent the molded article of a pressure increasing agent and the molded articles of a gas generating agent from mixing together before the actuation.

A metal such as aluminum and stainless steel and a combustible substance such as nitrocellulose can be used as a material for the partition wall.

The shape of the partition wall is not particularly limited, provided that the abovementioned functions are not impaired. Thus, a disk, a partition wall having a round bottom surface and an annular circumferential surface (the width thereof corresponds to the width of the charged molded article of a pressure increasing agent) extending from the bottom surface, and a container such as a canister (can) for enclosing the molded article of a pressure increasing agent can be used.

In the gas generator in accordance with the present invention, since the molded articles of a gas generating agent and the molded article of a pressure increasing agent are arranged inside the combustion chamber, combustibility of the molded articles of a gas generating agent inside the combustion chamber is increased from the initial stage of actuation.

Embodiment of the Invention

An embodiment of the present invention will be described with reference to FIG. 1. FIG. 1 is a cross-sectional view in the X-axis direction of a gas generator 10.

An ignition device 20 is attached to one end of a cylindrical housing 11. The cylindrical housing 11 is made from a metal such as aluminum or stainless steel and the inner diameter and the outer diameter thereof are each uniform.

The ignition device 20 has an igniter main body 21 provided with an electroconductive pin 24, an igniter collar 22, and a resin (resin portion) 23. An ignition device same as that used in the conventional gas generators can be used.

The igniter main body 21 depicted in FIG. 1 is covered with the resin 23, but the igniter main body which is not covered with the resin 23 may be also used.

When the igniter main body 21 is covered with the resin 23, a fragile portion can be provided at a specific location (for example, a top surface 21a) to impart directivity to the discharged combustion product.

A diffuser portion 30 provided with a plurality of gas discharge ports 31 is attached to the other end of the cylindrical housing 11.

The diffuser portion 30 is of a cup-like shape, has a flange portion 32 in the opening, and is integrally connected by welding to the cylindrical housing 11 at the flange portion 32.

An annular inner circumferential surface 32a is formed by the flange portion 32 and the cylindrical housing 11 on the diffuser portion 32 side in the cylindrical housing 11.

A columnar filter 35 is disposed inside the cylindrical housing 11 so as to be in contact with the diffuser portion 30.

The columnar filter 35 is fitted such that the circumferential edge of the end surface thereof on the diffuser portion 30 side abuts against the annular inner circumferential surface 32a.

The filter 35 may be press-inserted into the cylindrical housing 11 or fixed in the state depicted in FIG. 1 by concaving inwardly the portion of the cylindrical housing 11 that is directly opposite to the circumferential surface of the filter 35. It is also possible to fix the circumferential edge of the filter by a plurality of protrusions formed in the circumferential direction, instead of the annular inner circumferential surface 32a.

A filter similar to that used in known gas generators can be used as the filter 35.

In FIG. 1, the cup member 33 of the same shape as the inner circumferential surface of the diffuser portion 30 and the inner circumferential surface 11a of the cylindrical housing where the filter 35 is abutted, is fitted thereinto from the inner side.

The cup member 33 is made from a metal such as aluminum and closes the gas discharge ports 31 to prevent the penetration of moisture before the actuation. At the time of actuation, the cup member is easily ruptured to open the gas discharge ports 31. The plurality of the gas discharge ports 31 can be closed by attaching a seal tape made from aluminum, or the like, from the inside, instead of using the cup member 33.

A combustion chamber 15 is formed inside the cylindrical housing 11.

The combustion chamber 15 is a space with a length L from the top surface 21a of the igniter main body 21 on the ignition device 20 side to the surface (the surface at the inner side in the X-axis direction) 35a of the filter 35. When the molded articles of a gas generating agent 41 are also charged into the annular space surrounding the igniter main body 21, the annular space also functions as a combustion chamber, but is not included in the length L of the combustion chamber 15.

When the filter 35 is not installed, the combustion chamber space extends to the flange portion 32 of the diffuser portion 30. In this case, a separation member can be arranged to separate the combustion chamber 15 from the diffuser portion 30. A combustible material which burns at the time of actuation or a perforated member made from a metal can be used as the separation unit.

The molded articles of a gas generating agent 41 and the molded article of a pressure increasing agent 42 are charged into the combustion chamber 15.

The molded articles of a gas generating agent 41 are charged to be in contact with the ignition device 20 in a charging space (the space with a length obtained by subtracting the thickness of the molded article of a pressure increasing agent 42 from the length L of the combustion chamber) inside the combustion chamber 15 which is obtained by excluding the charged portion of the molded article of a pressure increasing agent 42.

The molded articles of a gas generating agent 41 are charged randomly into the combustion chamber 15, but such that the total volume (V1) of the molded articles of a gas generating agent 41 is less than volume (V2) of the charging space.

When the molded articles of a gas generating agent 41 do not have a through hole, it is preferred that the relationship V1/V2=0.50 to 0.90 is satisfied.

Since V1 and V2 satisfy this relationship, the molded articles of a gas generating agent 41 charged into the combustion chamber 15 are not in intimate contact with each other. Thus, the gaps are formed such that the combustion product generated from the ignition device 20 and the combustion gas generated by combustion of the molded articles of a gas generating agent 41 pass between the molded articles of a gas generating agent.

The molded articles of a gas generating agent 41 have the desired shape such as a columnar or a disk shape.

Where the molded articles of a gas generating agent 41 have a through hole, a range of V1/V2=0.40 to 0.60 is obtained, based on the calculation, in which the volume of holes is subtracted from the total volume (V1) and added to volume (V2) of the charging space.

Examples of the molded articles of a gas generating agent 41 having a through hole include articles of a columnar shape, depicted in FIG. 1, provided with a single through hole or a plurality of through holes in the length direction, and disk-shaped articles provided with a single through hole or a plurality of through holes in the thickness direction.

The molded article of a pressure increasing agent 42 is charged in contact with the filter 35, as depicted in FIG. 1, and is not in contact with the ignition device 20.

The charging position of the molded article of a pressure increasing agent 42 is not limited to that depicted in FIG. 1, and the molded article of a pressure increasing agent 42 may be charged within a range from a position at a distance of 1/3L from the ignition device 20 (from the top surface of the igniter main body 21) to the filter surface 35a.

The molded article of a pressure increasing agent 42 has the desired shape such as a columnar or a disk shape. In FIG. 1, a large number of the molded articles of a pressure increasing agent 42 are charged such as to form a disk abutting against the inner circumferential surface 11a of the cylindrical housing 11.

It is preferred that the total volume (V3) of the molded article of a pressure increasing agent 42 and the volume (V4) of the charging space (in FIG. 1, the volume of a charging space of a columnar shape) of the molded article of a pressure increasing agent 42 satisfy the relationship of V3/V4 being about 1.0.

Where V3/V4 is about 1.0 and V1/V2=0.50 to 0.90, the charging density of the molded article of a pressure increasing agent 42 is made higher than that of the molded articles of a gas generating agent.

While the molded articles of a gas generating agent 41 need to be arranged to have a gap therebetween in order to facilitate the passage of the combustion product generated from the ignition device 20, the molded article of a pressure increasing agent 42 is preferably arranged to have high charging density such as represented by the above-described relationship because it is preferred that the molded article of a pressure increasing agent 42 is easily ignited and burned upon receipt of the combustion product.

Since it is preferred that the molded article of a pressure increasing agent 42 is easily ignited and burned, when the molded article of a gas generating agent 41 and the molded article of a pressure increasing agent 42 are of the same shape, it is preferred that the total surface area of the charged molded articles of a pressure increasing agent 42 is increased by reducing the molded article of a pressure increasing agent 42 in size.

The combustion temperature of the molded articles of a gas generating agent 41 is preferably within a range of 1000° C. to 1700° C.

The combustion temperature of the molded article of a pressure increasing agent 42 is preferably higher than that of the molded articles of a gas generating agent 41, and is preferably within a range of 1700° C. to 3300° C.

The charged mass (M1) of the molded articles of a gas generating agent 41 is greater than the charged mass (M2) of the molded article of a pressure increasing agent 42. Thus, M2/M1 is preferably within a range of 0.1 to 0.5.

A partition wall (not depicted in the drawing) can be disposed between the molded articles of a gas generating agent 41 and the molded article of a pressure increasing agent 42 inside the combustion chamber 15 in order to prevent the molded articles of a gas generating agent 41 and the molded article of a pressure increasing agent 42 from mixing together before the actuation.

The partition wall is selected from a partition wall made from a metal (aluminum or the like), that is melted and deformed by heat at the time of actuation, and a partition wall, that is burned by heat (nitrocellulose and the like) at the time of actuation. Alternatively, a perforated metallic member can be used. In this case, the size of the each port is such that the molded article of a pressure increasing agent 42 does not penetrate therethrough.

The molded article of a pressure increasing agent 42 can be also charged into a canister made from a metal such as aluminum, and this configuration has functions same as those of the partition wall.

The thickness of the partition wall (the canister) is 0.1 to 0.5 mm.

Since the molded articles of a gas generating agent 41 and the molded article of a pressure increasing agent 42 are charged into the cylindrical housing 11 (the combustion chamber 15) such as to be in contact with the inner circumferential surface 11a, the cross-sectional areas thereof in the direction perpendicular to the X-axis direction are the same.

Therefore, when the combustion product generated from the ignition device 20 moves toward the diffuser portion 30, the combustion product necessarily collides with the molded article of a pressure increasing agent 42.

Further, even when the molded article of a pressure increasing agent 42 is charged into a container such as a canister, since the thickness of the canister is negligibly small, the cross-sectional areas of the molded articles of a gas generating agent 41 and the molded article of a pressure increasing agent 42 are substantially the same.

The operation of the gas generator 10 depicted in FIG. 1 will be explained hereinbelow.

When the ignition device 20 is actuated and a combustion product is generated therefrom, the ignition and combustion are started from the portion of the molded articles of a gas generating agent 41, in contact with the ignition device 20 inside the combustion chamber 15. As a result, a combustion gas is generated.

Since the cylindrical housing 11 (the combustion chamber 15) is of an elongated shape, the molded articles of a gas generating agent 41 charged into the combustion chamber 15 are sequentially ignited and burned in the X-axis direction (toward the diffuser portion 30).

Further, part of the combustion product generated upon the actuation of the ignition device 20 advances in the X-axis direction (toward the diffuser portion 30) through the gaps between the molded articles of a gas generating agent 41 and causes ignition and combustion of the molded article of a pressure increasing agent 42, which results in generation of combustion gas.

Since the pressure inside the combustion chamber 15 is increased by the combustion gas generated by the combustion of the molded article of a pressure increasing agent 42, the ignition and combustion of the unburned molded articles of a gas generating agent 41 are accelerated.

At the initial stage of actuation, since the amount of gas generated from the molded articles of a gas generating agent 41 is less than the amount of gas discharged from the gas discharge ports 31, the increase in pressure inside the combustion chamber is suppressed, but because the molded article of a pressure increasing agent 42 is present, the abovementioned problems do not arise and the pressure inside the combustion chamber 15 at the initial stage of actuation is maintained.

Then, the cup member 33 closing the gas discharge ports 31 is ruptured by the rise of pressure inside the combustion chamber 15, the gas discharge ports 31 are opened, and the gas is discharged to the outside (into an airbag when the gas generator is used in an airbag apparatus).

Since the molded articles of a gas generating agent 41 and the molded article of a pressure increasing agent 42 are thus charged into the combustion chamber, the entire amount of the molded articles of a gas generating agent 41 inside the combustion chamber 15 is reliably and rapidly ignited and burned even when the housing 11 of an elongated shape is used.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator, comprising:
an ignition device provided at one end of a cylindrical housing and a diffuser portion having a gas discharge port and provided at the other end of the housing,
molded articles of a gas generating agent and a molded article of a pressure increasing agent charged into a combustion chamber inside the cylindrical housing,
the combustion chamber being a space inside the cylindrical housing excluding the ignition device and the diffuser portion,
the molded articles of a gas generating agent being charged, in a charging space remained except for a charging portion for the molded article of a pressure increasing agent inside the combustion chamber, such that the molded articles of a gas generating agent is in contact with the ignition device and a total volume of the molded articles of a gas generating agent is less than a volume of the charging space,
the molded article of a pressure increasing agent being charged in contact with the molded articles of a gas generating agent at a position axially distant from the ignition device in the combustion chamber,
a combustion temperature of the molded articles of a gas generating agent being 1000° C. to 1700° C., and a combustion temperature of the molded article of a pressure increasing agent being higher than that of the molded articles of a gas generating agent,
a charged mass of the molded articles of a gas generating agent being larger than a charged mass of the molded article of a pressure increasing agent, and
the molded article of a pressure increasing agent being to burn out before burnout of the molded articles of a gas generating agent at the time of actuation.

2. The gas generator according to claim 1, wherein
the total volume (V1) of the molded articles of a gas generating agent and the volume (V2) of the charging space of the molded articles of a gas generating agent satisfy the relationship V1/V2=0.50 to 0.90 when the molded articles of a gas generating agent do not have a through hole.

3. The gas generator according to claim 1, wherein
the molded article of a pressure increasing agent is charged between a position at a distance of 1/3L from the ignition device and the diffuser portion, where L stands for the length of the combustion chamber.

4. The gas generator according to claim 1, wherein,
inside the combustion chamber,
the molded article of a pressure increasing agent is charged such as to form a disk abutting against the inner circumferential surface of the cylindrical housing, and
the molded articles of a gas generating agent are charged into one or two remaining columnar spaces.

5. The gas generator according to claim 1, wherein
a filter is disposed between the combustion chamber and the diffusion portion.

6. The gas generator according to claim 1, wherein
the molded articles of a gas generating agent and the molded article of a pressure increasing agent are different from each other in at least one of shape, size, composition and composition ratio.

7. A gas generator, comprising:
an ignition device provided at one end of a cylindrical housing and a diffuser portion having a gas discharge port and provided at the other end of the housing,
molded articles of a gas generating agent and a molded article of a pressure increasing agent charged into a combustion chamber inside the cylindrical housing,
the combustion chamber being a space inside the cylindrical housing excluding the ignition device and the diffuser portion,
the molded articles of a gas generating agent being charged, in a charging space remained except for a charging portion for the molded article of a pressure increasing agent inside the combustion chamber, such that the molded articles of a gas generating agent is in contact with the ignition device and a total volume of the molded articles of a gas generating agent is less than a volume of the charging space,
the molded article of a pressure increasing agent being charged in the end portion of the combustion chamber opposite the ignition device, and the molded article of a pressure increasing agent and the molded articles of a gas generating agent being separated by a partition wall,
the partition wall being selected from a partition wall formed of a metal that is melted and deformed by heat at the time of actuation, a partition wall that is burned by heat at the time of actuation, a partition wall that is not melted or deformed by heat at the time of actuation but has ports,
a combustion temperature of the molded articles of a gas generating agent being 1000° C. to 1700° C., and a combustion temperature of the molded article of a pressure increasing agent being higher than that of the molded articles of a gas generating agent,
a charged mass of the molded articles of a gas generating agent being larger than a charged mass of the molded article of a pressure increasing agent, and
the molded article of a pressure increasing agent being to burn out before burnout of the molded articles of a gas generating agent at the time of actuation.

8. The gas generator according to claim 7, wherein
the total volume (V1) of the molded articles of a gas generating agent and the volume (V2) of the charging space of the molded articles of a gas generating agent satisfy the relationship V1/V2=0.50 to 0.90 when the molded articles of a gas generating agent do not have a through hole.

9. The gas generator according to claim 7, wherein
the molded article of a pressure increasing agent is charged between a position at a distance of 1/3L from the ignition device and the diffuser portion, where L stands for the length of the combustion chamber.

10. The gas generator according to claim 7, wherein,
inside the combustion chamber,
the molded article of a pressure increasing agent is charged such as to form a disk abutting against the inner circumferential surface of the cylindrical housing, and
the molded articles of a gas generating agent are charged into one or two remaining columnar spaces.

11. The gas generator according to claim 7, wherein the molded articles of a gas generating agent and the molded article of a pressure increasing agent are different from each other in at least one of shape, size, composition and composition ratio.

* * * * *